United States Patent [19]

Westeppe et al.

[11] Patent Number: 4,970,262
[45] Date of Patent: Nov. 13, 1990

[54] PROCESS FOR THE PRODUCTION OF MOULDING COMPOSITIONS FROM THERMOPLASTIC POLYAMIDE AND GRAFT RUBBER, AND CORRESPONDING MOULDING COMPOSITIONS

[75] Inventors: Uwe Westeppe, Remscheid; Ludwig Trabert, Krefeld; Rudolf Binsack, Krefeld; Dieter Wittmann, Krefeld; Christian Lindner, Cologne; Josef Merten, Korschenbroich, all of Fed. Rep. of Germany

[73] Assignee: Bayer Aktiengesellschaft, Leverkusen, Fed. Rep. of Germany

[21] Appl. No.: 273,673

[22] Filed: Nov. 21, 1988

Related U.S. Application Data

[63] Continuation of Ser. No. 107,057, Oct. 13, 1987, abandoned.

[30] Foreign Application Priority Data

Oct. 22, 1986 [DE] Fed. Rep. of Germany ....... 3635826
Nov. 4, 1986 [DE] Fed. Rep. of Germany ....... 3637441

[51] Int. Cl.$^5$ .................... C08L 51/00; C08L 77/00
[52] U.S. Cl. ...................................... 525/66; 525/902
[58] Field of Search ............................... 525/66; 264/5

[56] References Cited

U.S. PATENT DOCUMENTS 4,581,408 4/1986 Trabert et al. .................. 525/66
4,614,763 9/1986 Trabert et al. .................. 525/66

FOREIGN PATENT DOCUMENTS 0155480 9/1985 European Pat. Off. .
3405532 8/1985 Fed. Rep. of Germany .
0123639 9/1980 Japan ................................ 525/184
0125153 9/1980 Japan ................................ 525/183
62-86048 4/1987 Japan .

OTHER PUBLICATIONS

Chemical Abstracts, Book 103, No. 6, Aug. 12, 1985, p. 34, No. 38186y.

*Primary Examiner*—Ana L. Carrillo
*Attorney, Agent, or Firm*—Connolly and Hutz

[57] ABSTRACT

The invention relates to thermoplastic polyamide moulding compositions with improved toughness at low temperatures consisting of at least 60% by weight of polyamide and from 3 to 35% by weight of graft rubbers from the group comprising diene rubbers and acrylate rubbers, which are produced in that a mixture of the two components is produced in the presence of from 0.01 to 5% by weight of a radical forming agent and the moulding compositions are then heated below the polyamide melting point as far as possible in the absence of oxygen.

13 Claims, No Drawings

PROCESS FOR THE PRODUCTION OF MOULDING COMPOSITIONS FROM THERMOPLASTIC POLYAMIDE AND GRAFT RUBBER, AND CORRESPONDING MOULDING COMPOSITIONS

This application is a continuation, of application Ser. No. 107,057, filed Oct. 13, 1987, now abandoned.

The invention relates to thermoplastic polyamide moulding compositions with improved toughness at low temperatures from at least 60% by weight of polyamide and from 3 to 35% by weight of graft rubbers from the group comprising diene rubbers and acrylate rubbers, which are produced in that a mixture of the two components is produced in the presence of from 0.01 to 5% by weight of a radical forming agent and the moulding compositions are then heated below the polyamide melting point as far as possible in the absence of oxygen.

Moulding compositions composed of polyamides have proven useful owing to their mechanical strength values such as rigidity, abrasion resistance, hardness, dynamic and thermal loadability and their ease of production. Their inadequate toughness is a disadvantage.

There have been a number of proposals for improving the toughness of polyamide moulding compositions by addition of other polymers. Thus, polyolefins (DE-A No. 1 694 802, DE-A No. 2 038 317, DE-A 3 022 295) and ethylene ionomers (EP-A No. 34 704, EP-A No. 69 200, EP-A No. 72 480) have been proposed. Graft acrylate rubbers and diene rubbers which have a quite specific graft structure and are produced by certain processes have also been proposed as modifiers (EP-A No. 3 126, DE-A No. 2 758 615, DE-A No. 3 101 771, DE-A No. 3 120 803). These moulding compositions generally have improved toughness. However, it has been found that such moulding compositions cannot be used completely satisfactorily for important applications, for example in the automotive industry, on the vehicle body, the bumpers, and spoilers, the steering wheel and the steering column. Particular requirements have to be met in these cases, in particular at low temperatures.

Elastoplastic compositions composed of less than 50% by weight of polyamide, cross-linked rubbers in contents of up to 80% by weight and inert plasticizers which have a cross-linking effect during blending/mastication in the presence of vulcanisers, are described in U.S. Pat. No. 4,173,556. Elastomeric products are thus obtained.

Polyamide moulding compositions with improved toughness can be obtained by heating mixtures of polyamides and graft acrylate and diene rubbers below the melting point of thepolyamide (DE No. 3 405 532). Disadvantages of this process, in particular for industrial applications, however, include the long residence times (up to 10 h) and the associated energy costs.

It has surprisingly now been found that products with good toughness values at low temperatures are obtained from thermoplastic polyamide compositions if mixtures of at least 60% by weight of polyamide and a highly cross-linked graft rubber are produced in the presence of a radical forming agent and are heated for a short time to temperatures below the melting point of the polyamide, preferably in the substantial absence of oxygen.

Although it is known that polyamides can be cross-linked using radical-forming catalysts (see DE-B No. 1 149 531), the toughness at low temperatures is not significantly altered by this process and, moreover, cross-linked polyamides with processing problems have to be dealt with.

In addition, it would be expected during the reaction with the radical forming agents in the presence of graft rubber that these graft products, in particular those based on polybutadiene, would be damaged and would therefore be unusable and embrittlement might take place.

The invention relates to a process for the production of thermoplastic polyamide compositions based on I. at least 60% by weight, preferably at least 68% by weight and in particular at least 75% by weight, based on components I to III, of a thermoplastic polyamide, II. from 3 to 35% by weight, preferably from 5 to 30% by weight, in particular from 10 to 24% by weight, based on components I to III, of a cross-linked graft rubber having a gel content of at least 50% by weight, preferably $\geq 80\%$ by weight, in particular $\geq 90\%$ by weight, III. from 0.01 to 5% by weight, preferably from 0.01 to 2% by weight, in particular from 0.01 to 1% by weight, based on components I to III, of a radical forming agent, preferably a peroxide and/or hydroperoxide, by blending the components with melting, granulation and heating of the granulate to temperature of from 5° to 80° C. below the melting point of the polyamide, as far as possible in the absence of oxygen and for at least half an hour.

The invention also relates to the thermoplastic polyamide compositions which are tough at low temperatures and are obtained by the process according to the invention and to their use for the thermoplastic processing of shaped articles with increased toughness at low temperatures.

The moulding compositions according to the invention are preferably produced in such a way that the polymer components I and II are mixed together, with melting, preferably in a double shaft extruder and are processed to a granulate and are then heated, preferably as far as possible in the absence of oxygen (for example under vacuum or under $N_2$) to temperatures of from 5° to 80° C., preferably from 10° to 50° C., in particular from 15° to 40° C. below the melting point of the polyamide used for producing the alloy, for at least half an hour, preferably $\leq 8$ h, in particular from 0.5 to 3 h.

All thermoplastic polyamides, preferably partially crystalline polyamides are suitable as polyamides I. Polyamide-6, polyamide-66 or copolymers thereof can thus be used as partially crystalline polyamides for the moulding compositions according to the invention. Partially crystalline polyamides whose acid component consists wholly or partially of terephthalic acid and/or isophthalic acid and/or suberic acid and/or sebacic acid and/or azelaic acid and/or adipic acid and/or cyclohexane dicarboxylic acid, whose diamine component consists wholly or partially of m- and/or p-xylylenediamine and/or hexamethylene diamine and/or 2,2,4-tri methylene hexamethylene diamine and/or 2,4,4-trimethylhexamethylene diamine and/or isophorone diamine can also be used.

Suitable polyamides also include those which have been produced, in part, from lactams containing from 6 to 12 carbon atoms with concurrent use of one or more of the above-mentioned starting components.

Particularly preferred partially crystalline polyamides include polyamide-6 and polyamide-66.

The polyamides should preferably have a relative viscosity (measured in a 1% by weight solution in m-cresol at 25° C.) of from 2.0 to 5.0, particularly preferably from 2.5 to 4.0.

Preferred graft rubbers II have average particle diameters $d_{50}$ of from 0.05 to 1, preferably from 0.1 to 0.8, in particular from 0.2 to 0.8 μm.

The average particle diameter $d_{50}$ is the diameter above and below which 50% by weight of the particles lie in each case. It can be determined by ultracentrifuge measurement (W. Scholtan, H. Lange, Kolloid. Z. and Z. Polymere 250 (1972), 782-796) or by electron microscopy and subsequent particle count (G. Kampf, H. Schuster, Angew, makromolekulare Chemie, 14, (1970), 111-129) or by light diffusion measurement.

The graft polymers II are cross-linked and have a gel content of at least 50% by weight, preferably of at least 80% by weight and in particular of at least 90% by weight, based on II.

The gel contents of the cross-linked diene rubbers are determined at 25° C. in toluene, the gel contents of the cross-linked acrylate rubbers at 25° C. in dimethylformamide (M. Hoffmann, H. Kramer, R. Kuhn, Polymeranalytik I und II, Georg Thieme Verlag, Stuttgart 1977).

Preferred graft rubbers II include graft polymers obtained by graft polymerisation of from 15 to 60% by weight, preferably of from 20 to 50% by weight, in particular from 25 to 40% by weight of at least one vinyl or vinylidene monomer, preferably from the group comprising styrene, α-methylstyrene, acrylonitrile, $C_1$-$C_8$-alkylacrylate, $C_1$-$C_8$-alkylmethacrylate, hydroxy-$C_2$-$C_8$-alkyl(meth)acrylate, epoxy-$C_2$-$C_8$-alkyl(meth)acrylate, per 40 to 85, preferably to 50 to 80, in particular 60 to 75% by weight of a cross-linked diene or acrylate rubber in particle form.

The graft monomers can be grafted individually or in mixtures onto the graft rubber base. Preferred graft monomers include methylmethacrylate and mixtures of styrene and methylmethacrylate in a ratio of from 10:90 to 50:50 and mixtures of styrene and acrylonitrile in a ratio of from 90:10 to 50:50.

Preferred diene rubbers include cross-linked homopolymers and/or copolymers of conjugated $C_4$-$C_6$-dienes. Butadiene-1,3 is a preferred diene. The diene copolymers can contain up to 30% by weight, based on diene copolymer, of other ethylenically unsaturated monomers such as styrene, acrylonitrile, esters of acrylic or methacrylic acid with monohydric $C_1$-$C_4$-alcohols such as methylmethacrylate, ethylacrylate, ethylmethacrylate, in addition to the diene radicals.

The production of the diene rubber graft base and the graft polymers produced from it is described in "Methoden der Organischen Chemie" (Houben-Weyl), Vol. 14/1, Georg Thieme Verlag, Stuttgart 1961, P. 393-406, and in Ullmanns Encyclopadie der Technischen Chemie, 4th Edition, Vol 19, Verlag Chemie, Weinheim, 1981, P. 279-284.

Graft products of the type described in DE-A No. 27 42 176 are preferably used.

Polymers obtained by polymerisation of $C_1$-$C_8$-alkylacrylates are preferred graft bases. The polymers can also be copolymers of acrylic acid ester containing up to 40% by weight, based on copolymer, of other vinyl monomers such as styrene, acrylonitrile, methylmethacrylate, vinyl ester, vinyl ether.

The acrylate rubbers are cross-linked, esters of unsaturated $C_3$-$C_{12}$-monocarboxylic acids and unsaturated monohydric $C_2$-$C_{12}$-alcohols or saturated $C_2$-$C_{20}$-polyols with from 2 to 4 OH-groups for example unsaturated heterocyclic compounds such as trivinylcyanurate, triallylcyanurate, trivinylisocyanurate and triallylisocyanurate, in particular triallylcyanurate, polyfunctional vinyl compounds such as divinyl and trivinylbenzenes, but also triallyl phosphate preferably being used as monomers to be cross-linked which contain more than one copolymerisable double bond.

Preferred cross-linking monomers include allylmethacrylate, ethylene glycol dimethacrylate, diallylphthalate, and heterocyclic compounds containing at least three copolymerisable ethylenically unsaturated double bonds. The cyclic monomers triallylcyanurate, triallylisocyanurate, trivinylcyanurate, trisacryloylhexahydro-s-triazine, triallylbenzenes are particularly preferred cross-linking monomers.

The quantity of cross-linking monomers is preferably from 0.02 to 5, in particular from 0.05 to 2% by weight, based on rubber graft base. With cyclic cross-linking monomers containing at least three ethylenically unsaturated double bonds, it is advantageous to use not more than 1% by weight, based on rubber graft base.

Acrylate rubbers can also be multi-shell products which contain a cross-linked diene rubber composed of one or more conjugate dienes such as polybutadiene, or a copolymer of a conjugate diene with an ethylenically unsaturated monomer such as styrene and/or acrylonitrile as nucleus and partially polymerised acrylate monomer as shell.

The content of the polydiene nucleus in such multi-shell rubbers can be from 0.1 to 80, preferably from 10 to 50% by weight. Shell(s) and nucleus can be partially cross-linked or highly cross-linked independently of one another.

Preferred graft acrylate rubbers include those which
(a) are cross-linked with cyclic trifunctional comonomers such as triallylcyanurate, and triallylisocyanurate (described in DE-A No. 3 039 114);
(b) contain a polybutadiene nucleus (described in DE-A No. 3 200 070);
(c) have been produced "in the absence of suspension agent" (described in DE-A No. 3 117 052).

During the production of the graft rubbers II by graft copolymerisation which is usually carried out in the presence of radical starters, for example water-soluble initiators, emulsifiers or complex forming agents/graft activators as well as regulators, free polymers or copolymers of the graft monomers forming the graft shell are generally formed to a certain extent in addition to the actual graft copolymer.

Graft rubber II in the context of the invention is therefore the product obtained by polymerisation of graft monomers in the presence of the rubber latex.

The moulding compositions according to the invention have optimum properties if the quantity of free (co)polymer in the graft product II does not exceed 15% by weight, preferably 10% by weight, in particular 7% by weight, based on II.

The Staudinger index of these free (co)polymers should be less than 0.6 dl/g, preferably less than 0.4 dl/g, measured in dimethylformamide at 25° C.

Particularly preferred graft rubbers are described, for example in DE-A No. 2 742 176, 2 941 025, 3 151 441, 3 200 070 and in EP-A No. 34 748.

Inorganic or organic peroxides or hydroperoxides, for example compounds of the type $R_1OOR_2$ can be used as radical forming agents ($R_1=R_2=$alkyl, aryl, acyl, hydrogen; $R_1=$alkyl, aryl, acyl; $R_2=$hydrogen).

The total number of carbon atoms in the radicals $R_1$ and $R_2$ is $\leq 30$, preferably $\leq 25$. Examples include peroxides or hydroperoxides such as dibenzoylperoxide, tert.butylhydroperoxide, cumolhydroperoxide, laurylperoxide, 2,5-ditert.butyl-2,5-dimethylhexyl-peroxide, di-tert.butylperoxide or di-cumylperoxide.

Moreover, inorganic compounds having an O-O-grouping such as peroxides, per-compounds of sulphuric acids, for example persulphates or also perborates are also suitable as radical forming agents. Persulphates, for example $K_2S_2O_8$ are preferred. Examples include $(NH_4)_2S_2O_8$, $Na_2S_2O_8$, $Na_2O_2$, $BaO_2$, $NaBO_3.4H_2O$, $Na_2B_4O_8.10H_2O$.

A quite particularly preferred range of contents of peroxide/hydroperoxide compounds is from 0.05 to 0.30% by weight.

The moulding compositions according to the invention can contain conventional additives such as lubricants and mould release agents, nucleation agents, stabilisers, fillers and reinforcing agents, flame-proofing agents and synergists or stabilisers thereof as well as dyes. Plasticisers are not desired.

The moulding compositions can contain up to 60% by weight, based on the reinforced moulding composition, of fillers and/or reinforcing agents. Glass fibres are preferred reinforcing agents. Glass beads, mica, silicates, fieldspar, quartz, talcum, titanium dioxide, wollastonite are preferred fillers which can also have a reinforcing effect.

All known flame-proofing agents for example (cyclic) chlorine compounds and/or melamine and salts thereof such as melamine cyanurate or melamine sulphate and/or red phosphorus and/or phosphorus-containing flame-proofing agents and/or zinc oxide or zinc borate and similar additives can be added in the usual quantities to the moulding compositions.

The mixtures of polyamide I and graft rubber II can be produced in conventional mixer units such as rollers, kneaders, single and multiple shaft extruders. The temperature during production of the mixtures should be at least 10° C. and preferably at most 90° C. above the melting point of the polyamide.

Subsequent tempering can be carried out discontinuously or continuously under conditions under which oxidation is substantially ruled out, i.e. under inert protective gas such as nitrogen, carbon dioxide, argon or helium and under reduced pressure. All apparatus which allow such conditions are suitable. Heating can be carried out in a bed which is at rest or is moved, for example in a fluidized bed. Heating can also be carried out in vertical or in horizontal or in obliquely mounted tubular reactors. The type of reactor is not critical. In principle, all reactors and all processes known for the polycondensation of polyamide in the solid phase below the melting point of polyamide are suitable. It is generally preferable to carry out heating such that the moulding compositions are moved in the process because this simplifies the transfer of heat and any sticking which might occur is avoided. Thus, it may also be appropriate to carry out heating at graduated temperatures.

In certain cases, it may be advantageous to carry out tempering in the presence of small quantities of diamines, in which case it is preferable to use the diamine of the polyamide component.

The moulding compositions according to the invention are distinguished by improved toughness. The improvement in toughness at low temperatures is an excellent feature. The high bending resistance is a further feature.

The shaped articles produced from the moulding compositions according to the invention by injection moulding or extrusion are particularly suitable in cases where high impact loads have to be taken into consideration, for example for use in the automotive industry for bumpers, spoilers, over riders, body parts, steering wheels, steering columns or in general for parts of apparatus such as housings handles or fixing devices.

EXAMPLES

Components Used (A) Polyamide-6 with a relative viscosity (measured in a 1% by weight solution in m-cresol at 25° C.) of 3.0 (component I)

(B) Graft product produced from 80% by weight of graft base from cross-linked polybutadiene (gel content 85% by weight, measured in toluene) and 20% by weight of graft coating composed of methylmethacrylate; average particle diameter $d_{50}=0.4$ μm (graft product C from EP-A No. 58 331). (Component II).

(C) Graft product with core/sheath structure, produced from 81% by weight of graft base with 0.23 parts by weight of triallylcyanurate and 99.1 parts by weight of n-butyl acrylate, polymerised as sheath round 0.66 parts by weight of polybutadiene core (gel content of the graft base 89% by weight, measured in dimethylformamide at 25° C.), as well as 19% by weight of graft shell composed of methylmethacrylate; average particle diameter $d_{50}=0.5$ μm (production according to EP-A No. 34 748). (Component II).

(D) Radical forming agents of the commercially available type. (Component III).

Production and Testing of the Moulding Compositions

The components were melted and homogenised on a continuously operating double shaft extruder. The cylinder temperatures were selected such that mass temperatures of from 260° to 280° C. were maintained. The molten strand was degassed before leaving the nozzle, was cooled in water, granulated and dried.

ASTM - and NK-rods were injected from the granulates of the moulding compositions on a conventional injection moulding machine (mass temperature 260° C., mould temperature 80° C.). The notched bar impact toughness (according to Izod and Charpy) at the given temperatures and the bending resistance (according to DIN No. 53 452) were tested.

The granulate thus obtained was exposed to hot nitrogen in a tube at 200° C. (61 of nitrogen per h at a tube diameter of 20 mm) for differing periods. Test rods were produced and measured after cooling.

| | Component (% by weight) | | | | Radical Forming Agents | Tempering Time (Heating Period (h)) | Notched Bar Impact Toughness** (kJ/m²) | | | Bending Resistance (MPa) |
|---|---|---|---|---|---|---|---|---|---|---|
| Example | A | B | C | D | | | RT | −20° C. | −40° C. | |
| *1 | 70 | 30 | — | — | — | 0 | 51.5 | 46.5 | 16.0 | — |
| *1a | 70 | 30 | — | — | — | 1 | 51.8 | 48.8 | 18.9 | — |
| *1b | 70 | 30 | — | — | — | 3 | 53.6 | 49.3 | 34.3 | — |
| *2 | 70 | 30 | — | 0.2 | $K_2S_2O_8$ | 0 | 59.8 | 47.9 | 27.4 | 66.3 |
| 2a | 70 | 30 | — | 0.2 | " | 1 | 65.1 | 55.6 | 47.2 | 68.5 |
| 2b | 70 | 30 | — | 0.2 | " | 3 | 69.5 | 52.4 | 43.3 | 68.4 |
| *3 | 80 | 20 | — | 0.1 | " | 0 | 41.7 | 19.4 | 17.6 | 80.9 |
| 3a | 80 | 20 | — | 0.1 | " | 1 | 75.4 | 38.4 | 26.0 | 83.9 |
| 3b | 80 | 20 | — | 0.1 | " | 3 | 79.4 | 55.6 | 27.0 | 84.5 |
| *4 | 80 | — | 20 | 0.1 | " | 0 | 10.7 | — | — | 74.0 |
| 4a | 80 | — | 20 | 0.1 | " | 1 | 17.2 | — | — | 77.2 |

*Comparison Tests
**Notched bar impact toughness according to Charpy

| | Component (% by weight) | | | | Radical Forming Agents | Tempering Time (Heating Period (h)) | Notched Bar Impact Toughness** (kJ/m) | | | | Bending Resistance (MPa) |
|---|---|---|---|---|---|---|---|---|---|---|---|
| Example | A | B | C | D | | | RT | −20° C. | −30° C. | −40° C. | |
| *1 | 70 | 30 | — | — | — | 0 | 1150 | 800 | 420 | 250 | — |
| *1a | 70 | 30 | — | — | — | 1 | 1160 | 830 | 480 | 330 | — |
| *5 | 70 | 30 | — | 0.1 | $(NH_4)_2S_2O_8$ | 0 | 1081 | 984 | 285 | 199 | 49.6 |
| 5a | 70 | 30 | — | 0.1 | " | 1 | 1181 | 1031 | 982 | 490 | 52.9 |
| *6 | 70 | 30 | — | 0.1 | $K_2S_2O_8$ | 0 | 1136 | 971 | 856 | 248 | 57.3 |
| 6a | 70 | 30 | — | 0.1 | " | 1 | 1231 | 1077 | — | 767 | 58.0 |
| *7 | 70 | 30 | — | 0.1 | Dibenzoly-peroxide | 0 | 1013 | 697 | 325 | 223 | 56.1 |
| 7a | 70 | 30 | — | 0.1 | Dibenzoyl-peroxide | 1 | 1167 | 833 | 692 | 278 | 59.8 |
| *8 | 70 | 30 | — | 0.1 | t-butylhydro-peroxide | 0 | 1109 | 941 | 823 | 329 | — |
| 8a | 70 | 30 | — | 0.1 | t-butylhydro-peroxide | 1 | 1164 | 963 | — | 762 | — |

*Comparison Tests
**Notched bar impact toughness according to Izod (J/m)

We claim:

1. A process for the production of thermoplastic polyamide compositions, which are tough at low temperatures, based on
   I. at least 60% by weight, based on components I to III, of a thermoplastic polyamide,
   II. from 3 to 35% by weight, based on components I to III of a graft rubber comprising a cross-linked diene or acrylate graft rubber base in particle form with an average particle diameter of from 0.05 to 1 μm, grafted with at least one vinyl or vinylidene monomer, and having a gel content of at least 50% by weight,
   III. from 0.01 to 5% by weight, based on components I to III of a radical forming agent comprising inorganic peroxides, inorganic hydroperoxides, or organic peroxides, which process comprises mixing the components I., II. and III. and melting, granulation and heating of the granulate to temperatures of from 5° to 80° C. below the melting point of the polyamide for at least half an hour in an atmosphere with minimal oxygen.

2. A process according to claim 1, characterised in that at least 68% by weight, of a thermoplastic polyamide is used.

3. A process according to claim 1, characterised in that from 0.01 to 2% by weight of a radical forming agent is used.

4. A process according to claim 1, characterised in that the granulate is heated under vacuum or in a nitrogen atmosphere.

5. A process according to claim 1 wherein the amount of polyamide is at least 75% by weight.

6. A process according to claim 4 wherein the granulate is heated for from 0.5 to 3 hours.

7. A process according to claim 1 wherein the graft rubber base of component II. comprises cross-linked homopolymer or copolymer of conjugated $C_4$-$C_6$-dienes with up to 30% by weight, based on diene copolymer of ethyleneically unsaturated monomers comprising styrene, acrylonitrile, or esters of acrylic or methacylic acid with monohydric $C_1$-$C_4$ alcohols.

8. A process according to claim 1 wherein the graft rubber base of component II. comprises cross-linked acrylate rubber obtained by polymerization of $C_1$-$C_8$ alkylacrylates or by copolymerizing $C_1$-$C_8$ alkylacrylates with up to 40% by weight, based on copolymer, of vinyl monomers comprising styrene, acrylonitrile, methylmethacrylate, vinylester or vinylethers.

9. A process according to claim 1 wherein component II. comprises 15 to 60 weight % graft monomers grafted individually or in mixtures onto 85 to 40% cross-linked diene or acrylate rubber base in particle form, said graft monomers being at least one vinyl or vinylidene monomer comprising styrene, α-methylstyrene, acrylonitrile, $C_1$-$C_8$ alkylacrylate, $C_1$-$C_8$ alkylmethacrylate, hydroxy-$C_2$-$C_8$ alkyl(meth) acrylate or epoxy-$C_2$-$C_8$-alkyl(meth) acrylate.

10. A process according to claim 1 wherein the graft rubber base of component II. comprises a rubber cross-linked by 0.02 to 5% by weight, based on the rubber base, of esters of unsaturated $C_3$-$C_{12}$ monocarboxylic acids and unsaturated monohydric $C_2$–$C_{12}$-alcohols or saturated $C_2$–$C_{20}$-polyols with from 2 to 4 OH-groups or unsaturated heterocyclic compounds comprising trivinyl cyanurate, triallyl cyanurate, triallylisocyanurate, divinyl and trivinyl benzenes, or triallylphosphate.

11. A process according to claim 1 wherein II. is from 5 to 30% by weight of a graft rubber having a gel content of at least 80% by weight.

12. A process according to claim 11 wherein the gel content of the graft rubber is at least 90% by weight.

13. A process according to claim 1 wherein the graft rubber base of component II. comprises multi-shell rubbers, containing (a) 0.1 to 80% by weight, as nucleus, of a cross-linked diene rubber comprising one or more polymerized conjugated dienes, a copolymer of a conjugated diene with an ethylenically unsaturated monomer, or a mixture of said polymerized dienes and (b) a shell of polymerized acrylate monomer, with the nucleus and shell being at least partially cross-linked independently from one another.

* * * * *